United States Patent
Zangi

(10) Patent No.: US 9,065,603 B2
(45) Date of Patent: Jun. 23, 2015

(54) METHOD AND APPARATUS FOR CONTROLLING THE TOTAL OVERHEAD USED TO TRANSMIT CHANNEL STATE INFORMATION IN A WIRELESS NETWORK

(75) Inventor: Kambiz Zangi, Chapel Hill, NC (US)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 1149 days.

(21) Appl. No.: 12/570,360

(22) Filed: Sep. 30, 2009

(65) Prior Publication Data
US 2011/0077020 A1  Mar. 31, 2011

(51) Int. Cl.
*H04L 1/00* (2006.01)
*H04L 5/00* (2006.01)
*H04B 7/06* (2006.01)

(52) U.S. Cl.
CPC ............ *H04L 1/0026* (2013.01); *H04B 7/0658* (2013.01); *H04L 1/003* (2013.01); *H04L 5/0053* (2013.01); *H04L 5/0058* (2013.01)

(58) Field of Classification Search
None
See application file for complete search history.

(56) References Cited

U.S. PATENT DOCUMENTS

2007/0047512 A1* 3/2007 Zhang et al. ............ 370/343
2007/0195897 A1* 8/2007 Cheng et al. ............ 375/260

FOREIGN PATENT DOCUMENTS

EP    2 037 697 A1    3/2009

* cited by examiner

*Primary Examiner* — Jackie Zuniga Abad

(57) ABSTRACT

An amount of total overhead allocated by a wireless system for transmitting channel state information by a plurality of mobile stations serviced by the wireless system can be controlled by allocating a reporting interval, reporting size and subset of subcarriers to each of the mobile stations for use by the mobile stations in reporting channel state information on the subcarriers included in the subset allocated to the respective mobile stations. At least one of the reporting interval, reporting size and subset of subcarriers allocated to one or more of the mobile stations is modified as a function of the number of mobile stations reporting channel state information so that the total overhead allocated for transmitting the channel state information on all of the subcarriers remains generally constant regardless of the number of mobile stations reporting channel state information.

16 Claims, 3 Drawing Sheets

METHOD AND APPARATUS FOR CONTROLLING THE TOTAL OVERHEAD USED TO TRANSMIT CHANNEL STATE INFORMATION IN A WIRELESS NETWORK

TECHNICAL FIELD

The present invention generally relates to channel state information, and more particularly relates to controlling the amount of overhead used for the feedback of channel state information in a wireless network.

BACKGROUND

Coherent CoMP (Coordinated Multi-Point) transmission on the downlink significantly improves spectral efficiency and cell-edge bitrate of cellular systems. Coherent CoMP requires the network to know the state of the downlink channels allocated to each mobile station from a number of network antennas that are received strongly by each mobile station. In FDD (Frequency-Division Duplexing), the channel state information (CSI) is transmitted from each mobile station to the network on the assigned uplink channel. For an OFDM (Orthogonal Frequency-Division Multiplexing) system with FDD, let W denote the total number of subcarriers in the system, N the number of users reporting CSI per cell, B the average number of bits required to report the channel state information on each subcarrier, and T denote the reporting period used by each mobile station to report the channel state information.

Conventional techniques for enabling coherent CoMP require each mobile station to measure the downlink channel on all W subcarriers in the system and report the measurement, perhaps after compression, to the network every T seconds using the uplink channel. According to these conventional methods, the total average number of information bits B transmitted on the uplink for providing channel state information from all of the users to the network per cell is given by:

$$R_T = (W * N * B) / T \qquad (1)$$

From equation (1), it is clear that as the number of users per cell increases, the total feedback overhead, $R_T$, for conventional methods of reporting channel state information has a corresponding linear increase as a function of the number of new users. For a large number of users, the increased feedback load associated with reporting channel state information results in less uplink channel resources being available for transmission of user data on the uplink. Similarly, the spectral efficiency and cell-edge bitrate of an un-coordinated cellular system can be improved significantly if the network knows the state of the downlink channels to each mobile. The total feedback load for reporting channel state information fluctuates as a function of the number of users serviced by an uncoordinated base station which services an individual cell. That is, more uplink resources are consumed for reporting channel state information as the number of users serviced by the uncoordinated base station increases. Similar uplink resource fluctuations occur in TDD (Time-Division Duplex) based systems when the users are relied on to report some form channel state information using the uplink channel.

SUMMARY

For a network using FDMA (Frequency Division Multiple Access) scheduling on the downlink, each mobile station is transmitted to on a subset of downlink subcarriers. The network instructs each mobile station to report channel state information in the uplink only on the subcarriers allocated to that mobile station. This way, each mobile station reports channel state information on a subset of the total available subcarriers, not all of the subcarriers. The network can dynamically modify, preferably in a relatively slow manner, the subset allocated to one or more of the mobile stations as the number of mobile stations reporting channel state information in the cell changes. That is, the number of subcarriers included in the subset assigned to a particular mobile station can be decreased as the number of mobile stations reporting channel state information in the cell increases such that the total overhead allocated for transmitting the channel state information on all of the subcarriers remains generally constant regardless of the number of mobile stations reporting channel state information in the cell.

According to an embodiment, a method of controlling an amount of total overhead allocated by a wireless system for transmitting channel state information by a plurality of mobile stations serviced by the wireless system includes allocating a reporting interval, reporting size and subset of subcarriers to each of the mobile stations for use by the mobile stations in reporting channel state information on the subcarriers included in the subset allocated to the respective mobile stations. The method further includes modifying at least one of the reporting interval, reporting size and subset of subcarriers allocated to one or more of the mobile stations as a function of the number of mobile stations reporting channel state information so that the total overhead allocated for transmitting the channel state information on all of the subcarriers remains generally constant regardless of the number of mobile stations reporting channel state information.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
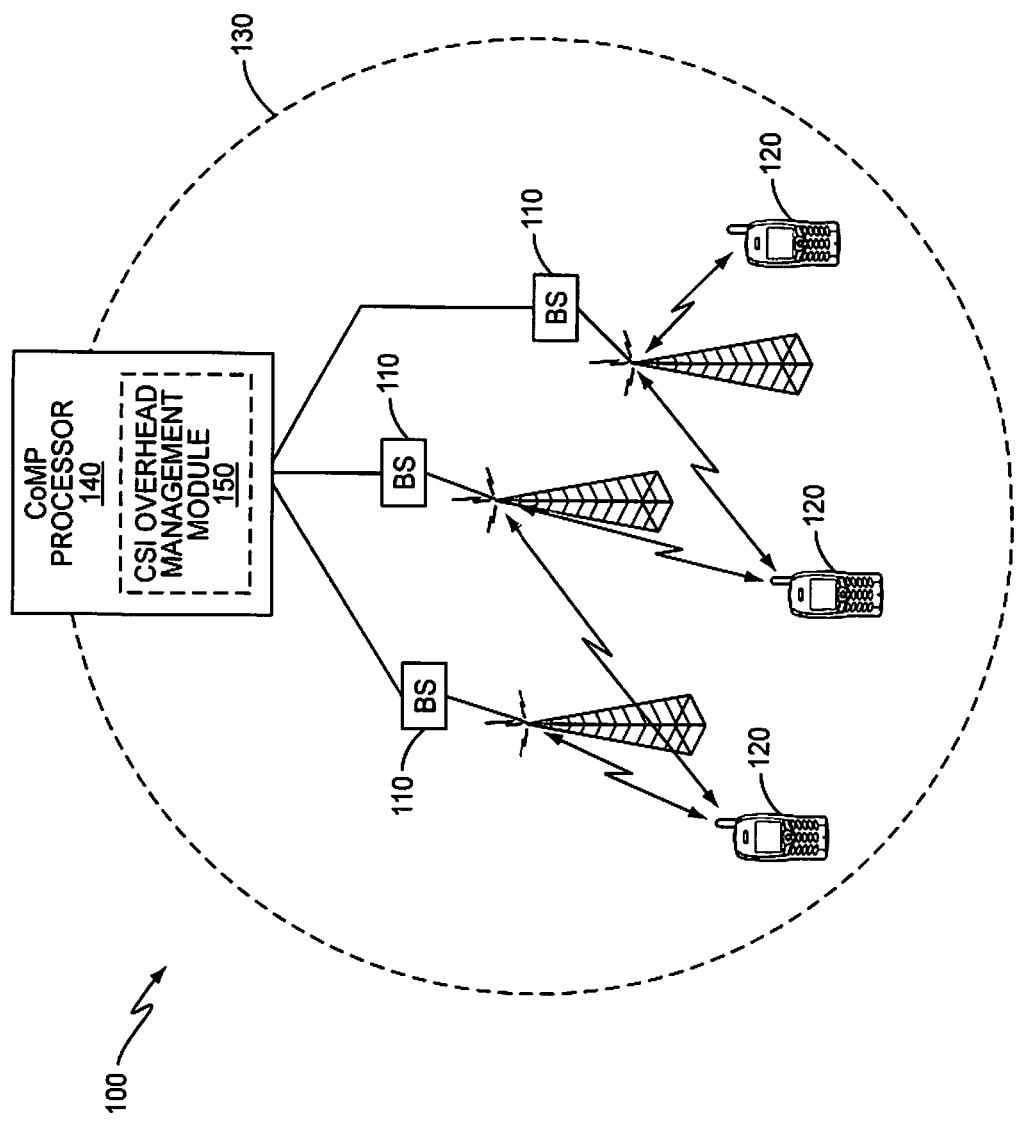
FIG. 1 illustrates a block diagram of an embodiment of a coordinated multi-point system which allocates a generally constant overhead for transmitting channel state information.

FIG. 1 illustrates an embodiment of a CoMP transmission network 100 where M base stations 110 transmit in the downlink direction to N mobile stations 120. The base stations 110 coordinate with one another to form a super-cell 130, also referred to herein as a CoMP cell. As the number of mobile stations 120 serviced in the CoMP cell 130 increases, the total channel resources are divided up among the various mobile stations 120, e.g. using FDMA scheduling in an OFDM system. The network 100 includes a CoMP processor 140 which can restrict the FDMA scheduler to allocate a known subset S(i) of subcarriers to each mobile station "i". Each mobile station 1" is instructed to report channel state information on only the subcarriers included in the allocated subset S(i). The channel state information is reported over an uplink channel.

The network 100 can choose to transmit to mobile station 1" on only a fraction of the subcarriers included in S(i), this fraction of downlink transmission subcarriers being denoted D(i). However, the network 100 does not transmit to mobile station "i" on any subcarriers not included in subset S(i). Furthermore, the network 100 can choose S(i) and S(j) to be overlapping sets so that the subsets allocated to mobile station "i" and mobile station "j" include one or more of the same subcarriers.

Figure 2:
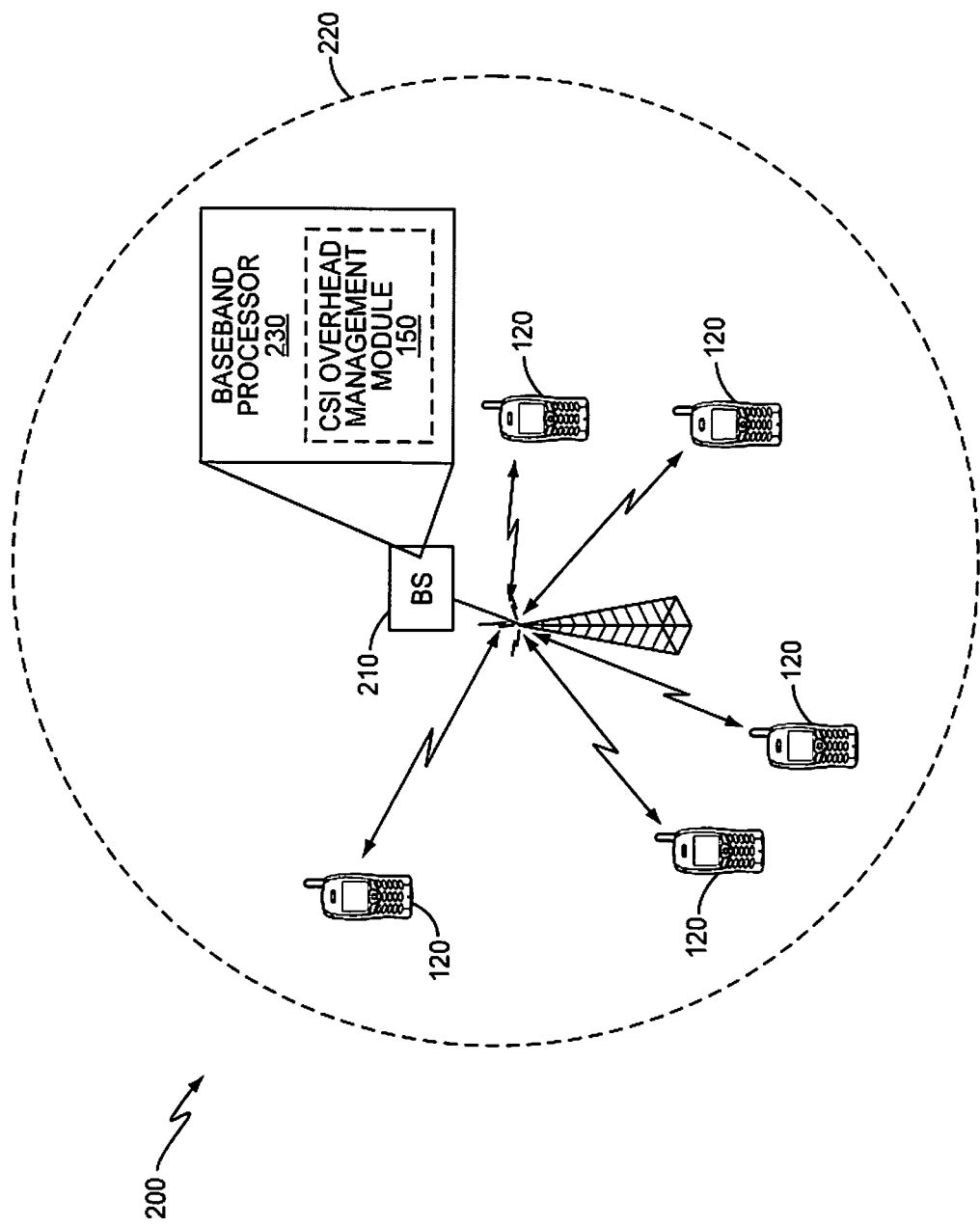
FIG. 2 illustrates a block diagram of an embodiment of an uncoordinated base station which allocates a generally constant overhead for transmitting channel state information.

FIG. 2 illustrates another embodiment of a wireless network 200 including an uncoordinated base station 210 that serves an individual cell 220. That is, the uncoordinated base station 210 is not part of a CoMP system. As with the CoMP network 100 of FIG. 1, the total channel resources are divided up among the various mobile stations 120 as the number of mobile stations 120 serviced in the individual cell 220 increases, e.g. using FDMA scheduling in an OFDM system. The uncoordinated base station 210 includes a baseband processor 230 which can restrict the FDMA scheduler to allocate a known subset S(i) of subcarriers to each mobile station "i". Each mobile station "i" is instructed to report channel state information on only the subcarriers included in the allocated subset S(i). As is the case with the CoMP network 100 of FIG. 1, the uncoordinated base station 210 can choose to transmit to mobile station 1" on only a fraction of the subcarriers included in S(i), but does not transmit to mobile station "i" on any subcarriers not included in subset S(i). Also, the uncoordinated base station 210 can also choose S(i) and S(j) to be overlapping sets so that the subsets allocated to mobile station "i" and mobile station "j" include one or more of the same subcarriers.

Both the CoMP processor 140 shown in FIG. 1 and the baseband processor 230 shown in FIG. 2 include a CSI (channel state information) overhead management module 150 for managing the total overhead allocated within the respective networks 100/200 for transmitting channel state information on the subcarriers allocated in the respective cells 130/220. According to the embodiments described next, the total channel state information feedback overhead $R_T$ given by equation (1) is maintained generally constant by each CSI overhead management module 150 regardless of the number of mobile stations 120 reporting channel state information. That is, the total overhead $R_T$ allocated for transmitting channel state information on all subcarriers per cell 130/220 may vary slightly over time, but remains relatively constant regardless of whether the number of mobile stations 120 reporting channel state information increases or decreases.

In more detail, let W(i) denote the number of subcarriers included in subset S(i) allocated to mobile station "i". Each CSI overhead management module 150 maintains a generally constant total overhead $R_T$ allocated for transmitting channel state information on all subcarriers available in the corresponding cell 130/220 as a function of the number N of mobile stations 120 reporting channel state information in the cell 130/220 as given by:

$$R_T = R(1) + R(2) + \ldots + R(N) \quad (2)$$
$$= (W(1)*B(1)/T(1)) + (W(2)*B(2)/T(2)) + \ldots +$$
$$(W(N)*B(N)/T(N))$$

In equation (2), R(i) is the overhead allocated to mobile station "i" for transmitting channel state information on the subcarriers included in subset S(i). Parameter T(i) indicates the channel state information reporting interval and parameter B(i) indicates the average reporting size per subcarrier in the set S(i). Parameter B(i) can be any measure of the size of the channel state information being reported, e.g. B(i) can be the average number of information bits transmitted by mobile station i" on the uplink for reporting channel state information on each subcarrier included in subset S(i).

Figure 3:
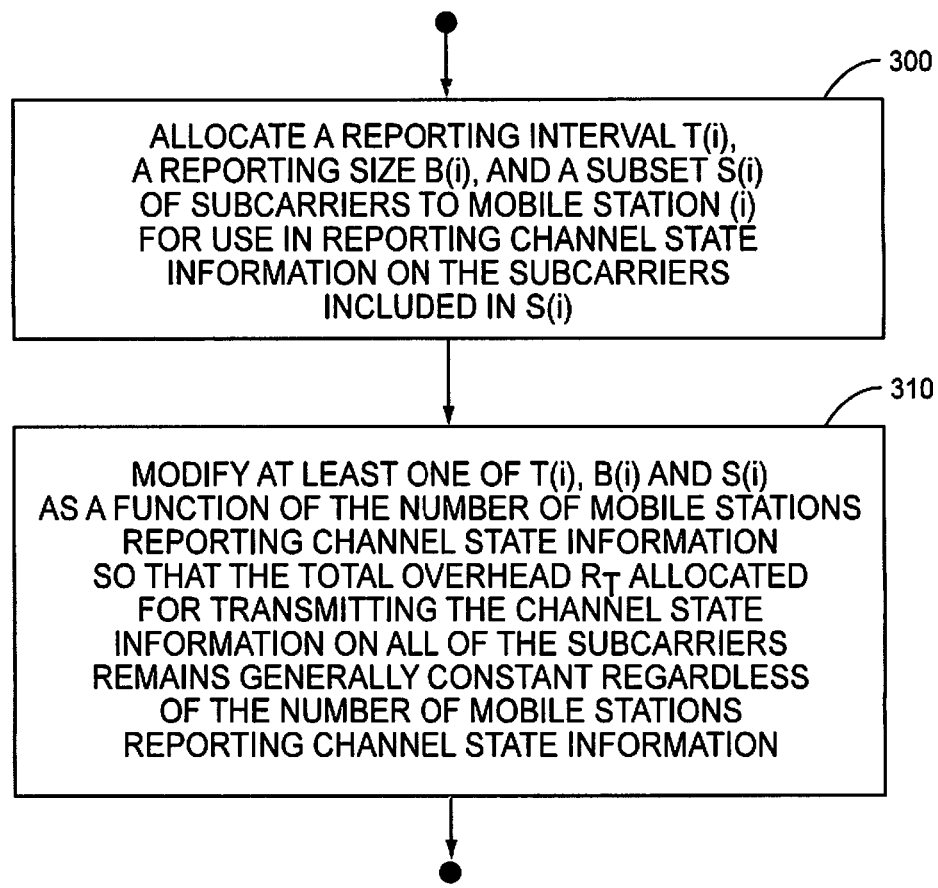
FIG. 3 illustrates a flow diagram of an embodiment of a method for controlling an amount of total overhead allocated by a wireless system for transmitting channel state information by a plurality of mobile stations serviced by the wireless system.

FIG. 3 illustrates one embodiment of a method implemented by each CSI overhead management module 150 for controlling the amount of total overhead $R_T$ allocated for transmitting channel state information by the mobile stations 120 serviced by the respective networks 100/200. The method includes allocating a reporting interval T(i), reporting size B(i) and subset S(i) of subcarriers to each mobile stations "i" for use by the mobile stations 120 in reporting channel state information on the subcarriers included in the subset allocated to the respective mobile stations 120 (Step 300). The method further includes modifying at least one of the reporting interval T(i), reporting size B(i) and subset S(i) of subcarriers allocated to one or more of the "i" mobile stations 120 as a function of the number N of mobile stations 120 reporting channel state information so that $R_T$ remains generally constant regardless of N as given by equation (2) (Step 310).

In one embodiment, each CSI overhead management module 150 increases T(i) by a sufficient amount when N increases so that mobile station "i" reports channel state information on the subcarriers included in subset S(i) less frequently. In another embodiment, B(i) can be reduced by a sufficient amount when N increases so that mobile station "i" uses less resources to report the channel state information on each subcarrier included in subset S(i). For example, fewer bits may be used to represent the channel state information. In yet another embodiment, each CSI overhead management module 150 decreases the number W(i) of subcarriers included in S(i) by a sufficient amount when N increases so that mobile station "i" reports channel state information on fewer subcarriers. One or more of T(i), B(i) and S(i) can be modified in the opposite way responsive to N decreasing. In general, any combination of T(i), B(i) and S(i) can be modified for each mobile station "i" when N changes so that $R_T$ remains generally constant as given by equation (2).

In some embodiments, the same fixed reporting interval T and the same fixed reporting size B are allocated to each of the N mobile stations 120, reducing equation (2) to:

$$R_T=(B/T)*\{W(1)+W(2)+\ldots+W(N)\} \quad (3)$$

According to these embodiments, T and B are fixed and each CSI overhead management module 150 modifies only the number W(i) of subcarriers included in subset S(i) allocated to mobile station "i" as a function of the number N of mobile stations reporting channel state information so that $R_T$ remains generally constant regardless of N. That is, each CSI overhead management module 150 chooses each W(i) such that equation (3) is satisfied.

In yet another embodiment, the number W(i) of subcarriers reported on by each mobile station 120 is determined as given by:

$$W(i)=(R_T*T)/(N*B) \text{ for all "i" in } \{1,2,\ldots,N\} \quad (4)$$

Equation (4) results in an equal number of sub-carriers being allocated to all mobile stations 120. As such, each CSI overhead management module 150 reduces each subset S(i) by the same number of subcarriers responsive to an increase in the number N of mobile stations 120 reporting channel state information. Similarly for a decrease in N, each subset S(i) is increased by the same number of subcarriers. However, in some scenarios, more subset allocation flexibility may be desirable.

According to one embodiment, the respective networks 100/200 assign more subcarriers to some mobile stations 120 than to others. In this case, the more general formulation given by either equation (2) or (3) can still be used to maintain a generally constant total overheard $R_T$ regardless of the number N of mobile stations reporting channel quality information. In one embodiment, each CSI overhead management module 150 considers mobile station priority when determining which of the subsets S(i) to modify. For example, a mobile station 120 having a more highly preferred service contract may receive more beneficial treatment (i.e., less interruption, more subcarriers, etc.) as compared to a mobile station 120 having a less preferred service contract. Each CSI management module 150 reduces the subcarriers allocated to lower priority mobile stations 120 before doing so to the mobile stations 120 having a higher priority. This way, the subcarriers allocated to the mobile stations 120 having the highest priority are reduced only after the subcarriers allocated to all other mobile stations 120 have been reduced and further reduction is still needed to ensure total overheard $R_T$ remains generally constant. In another embodiment, each CSI overhead management module 150 considers mobile station bandwidth demand when determining which of the subsets S(i) to modify. That is, each CSI overhead management module 150 looks to reduce the subcarriers allocated to those mobile stations 120 consuming less bandwidth responsive to an increase in N before reducing the subcarriers allocated to those mobile stations 120 using more bandwidth. For example, the number of subcarriers allocated to mobile stations 120 implementing voice only or text only applications can be reduced before reducing the number of subcarriers allocated to mobile stations 120 implementing video or graphics applications. Doing so better ensures uninterrupted services.

After each CSI overhead management module 150 decides the number W(i) of subcarriers, B(i), and T(i) that can be allocated to each mobile station "i" as previously described herein, each CSI overhead management module 150 chooses a subset S(i) of subcarriers of size W(i). According to one embodiment, subset S(i) includes contiguous subcarriers for mobile station "i" on the downlink channel. However, the allocated subcarriers need not be contiguous. Next, the respective network 100/200 informs mobile station "i" of the subset allocation, e.g. using the physical dedicated downlink control channel (PDCCH). Having received this information on the control channel, mobile station "i" starts reporting the channel state information on the subset of subcarriers specified by S(i) in accordance with T(i) and B(i). Parameters T(i) and B(i) may be tailored to mobile station "i" or be fixed and the same for each of the mobile stations 120 as previously described herein. In either case, the channel state information resource allocation embodiments described herein maintain the total overhead for reporting channel state information on all subcarriers per cell 130/220 at a generally constant level even as the number of mobile stations 120 reporting channel state information changes. This is especially beneficial in the CoMP network 100, where all mobile stations 120 can still be served with downlink coherent CoMP. That is, the advantages of coherent CoMP in terms of increased spectral efficiency and cell-edge bit rate are preserved while maintaining a generally constant total overhead for reporting channel state information on all subcarriers.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of controlling an amount of total overhead allocated by a wireless system for transmitting channel state information by a plurality of mobile stations serviced by the wireless system, comprising:
    allocating a subset of available subcarriers to each of the mobile stations for use by the mobile stations;
    allocating the same fixed reporting interval and the same fixed reporting size to each of the mobile stations;
    for each of the mobile stations, receiving channel state information on the subcarriers in the subset allocated to that mobile station;
    modifying the subset of subcarriers allocated to each of one or more of the mobile stations as a function of the number of mobile stations reporting channel state information so that the total overhead allocated for transmitting the channel state information on all of the subcarriers remains generally constant regardless of the number of mobile stations reporting channel state information; and
    wherein the number of subcarriers included in each of the subsets is a function of the total overhead, the fixed reporting interval, the fixed reporting size and the number of mobile stations serviced by the wireless system.

2. The method of claim 1, comprising including the same number of subcarriers in each of the subsets.

3. The method of claim 2, comprising modifying each of the subsets by the same number of subcarriers as a function of the number of mobile stations reporting channel state information so that the total overhead allocated for transmitting the channel state information on all of the subcarriers remains generally constant regardless of the number of mobile stations reporting channel state information.

4. The method of claim 3, comprising:
    reducing each of the subsets by the same number of subcarriers responsive to an increase in the number of mobile stations reporting channel state information; and
    increasing each of the subsets by the same number of subcarriers responsive to a decrease in the number of mobile stations reporting channel state information.

5. The method of claim 1, wherein the subsets allocated to at least two different ones of the mobile stations include one or more of the same subcarriers.

6. The method of claim 1, comprising determining which of the subsets to modify based on mobile station priority.

7. The method of claim 1, comprising determining which of the subsets to modify based on mobile station bandwidth demand.

8. A wireless system comprising:
    a channel state information overhead management module operable to:
        allocate a subset of available subcarriers to each of a plurality of mobile stations serviced by the wireless system for use by the mobile stations;
        allocate the same fixed reporting interval and the same fixed reporting size to each of the mobile stations;
        receive, for each of the mobile stations, channel state information on the subcarriers in the subset allocated to that mobile station; and
        modify the subset of subcarriers allocated to each of one or more of the mobile stations as a function of the number of mobile stations reporting channel state information so that an amount of total overhead allocated for transmitting the channel state information on all of the subcarriers remains generally constant regardless of the number of mobile stations reporting channel state information; and wherein the number of subcarriers included in each of the subsets is a function of the total overhead, the fixed reporting interval, the fixed reporting size and the number of mobile stations serviced by the wireless system.

9. The wireless system of claim 8, wherein the channel state information overhead management module is operable to include the same number of subcarriers in each of the subsets.

10. The wireless system of claim 9, wherein the channel state information overhead management module is operable to modify each of the subsets by the same number of subcarriers as a function of the number of mobile stations reporting channel state information so that the total overhead allocated for transmitting the channel state information on all of the subcarriers remains generally constant regardless of the number of mobile stations reporting channel state information.

11. The wireless system of claim 10, wherein the channel state information overhead management module is operable to:

reduce each of the subsets by the same number of subcarriers responsive to an increase in the number of mobile stations reporting channel state information; and increase each of the subsets by the same number of subcarriers responsive to a decrease in the number of mobile stations reporting channel state information.

12. The wireless system of claim 8, wherein the subsets allocated to at least two different ones of the mobile stations include one or more of the same subcarriers.

13. The wireless system of claim 8, wherein the channel state information overhead management module is operable to determine which of the subsets to modify based on mobile station priority.

14. The wireless system of claim 8, wherein the channel state information overhead management module is operable to determine which of the subsets to modify based on mobile station bandwidth demand.

15. The wireless system of claim 8, wherein the wireless system is a coordinated multi-point transmission system including a plurality of base stations operable to jointly service a super cell and the channel state information overhead management module is included in a processor coupled to each of the base stations.

16. The wireless system of claim 8, wherein the wireless system is a single base station operable to serve an individual cell and the channel state information overhead management module is included in a baseband processor of the base station.

* * * * *

UNITED STATES PATENT AND TRADEMARK OFFICE
CERTIFICATE OF CORRECTION

PATENT NO. : 9,065,603 B2  
APPLICATION NO. : 12/570360  
DATED : June 23, 2015  
INVENTOR(S) : Zangi It is certified that error appears in the above-identified patent and that said Letters Patent is hereby corrected as shown below:

In the specification

In Column 2, Lines 64-65, delete "mobile station 1'"" and insert -- mobile station "i" --, therefor.

In Column 3, Line 1, delete "mobile station 1'"" and insert -- mobile station "i" --, therefor.

In Column 3, Line 25, delete "mobile station 1'"" and insert -- mobile station "i" --, therefor.

In Column 4, Lines 4-5, delete "mobile station i'"" and insert -- mobile station "i" --, therefor.

Signed and Sealed this  
First Day of December, 2015

Michelle K. Lee  
*Director of the United States Patent and Trademark Office*